(12) United States Patent
Bloor et al.

(10) Patent No.: US 9,746,839 B2
(45) Date of Patent: Aug. 29, 2017

(54) RESPONSIVE LOAD CONTROL METHOD

(75) Inventors: Katie Bloor, London (GB); Kimon Roussopoulos, London (GB)

(73) Assignee: OPEN ENERGI LIMITED (GB)

( * ) Notice: Subject to any disclaimer, the term of this patent is extended or adjusted under 35 U.S.C. 154(b) by 844 days.

(21) Appl. No.: 14/236,111

(22) PCT Filed: Aug. 3, 2012

(86) PCT No.: PCT/GB2012/051892
§ 371 (c)(1),
(2), (4) Date: Jul. 22, 2014

(87) PCT Pub. No.: WO2013/017896
PCT Pub. Date: Feb. 7, 2013

(65) Prior Publication Data
US 2014/0336835 A1    Nov. 13, 2014

(30) Foreign Application Priority Data
Aug. 3, 2011 (GB) .................................. 1113426.9

(51) Int. Cl.
G05D 3/12       (2006.01)
G05B 15/02      (2006.01)
H02J 3/14       (2006.01)
H02J 3/00       (2006.01)

(52) U.S. Cl.
CPC ................. G05B 15/02 (2013.01); H02J 3/14 (2013.01); H02J 2003/003 (2013.01); Y02B 70/3225 (2013.01); Y04S 10/54 (2013.01); Y04S 20/222 (2013.01)

(58) Field of Classification Search
CPC ...... G05B 15/02; H02J 3/14; H02J 2003/003; Y04S 10/54; Y04S 20/222; Y02B 70/3225
USPC ....................................................... 700/295
See application file for complete search history.

(56) References Cited

U.S. PATENT DOCUMENTS 4,064,485 A     12/1977  Leyde
2006/0229768 A1*  10/2006  Chassin .................... H02J 3/14
                                                        700/295
2011/0125657 A1    5/2011  Boss et al.

FOREIGN PATENT DOCUMENTS

GB      2 426 878       12/2006
GB      2 471 759       1/2011
JP      2008-301701 A   12/2008
WO      2004/114495     12/2004
WO      2011/006828     1/2011

* cited by examiner

*Primary Examiner* — Robert Fennema
*Assistant Examiner* — Thomas Stevens
(74) *Attorney, Agent, or Firm* — Carmody Torrance Sandak & Hennessey LLP (57) ABSTRACT

The responsive load control method manages the allocation and adjustment of service triggering grid frequencies across a population of responsive loads. The responsive load control method is particularly suited to responsive loads that have substantially no duty cycle or which have a long duration (>1 hr) duty cycle. With this responsive load control method provision of the responsive load service is shared fairly amongst the population of contributing responsive loads.

5 Claims, 6 Drawing Sheets

RESPONSIVE LOAD CONTROL METHOD

CROSS REFERENCE TO RELATED APPLICATIONS

This application is a National Stage of International Application No. PCT/GB2012/051892, filed Aug. 3, 2012, the subject matter of which is herein incorporated by reference in its entirety.

FIELD OF THE INVENTION

The present invention relates to a responsive load control method for use in the balancing of power generation and power usage across an electrical power distribution network. The responsive load control method may be, but is not limited to, part of a responsive load service provided to electrical power distribution companies. The present invention further relates to apparatus adapted to implement the responsive load control method and to a software product which, when executed by a processor, implements the responsive load control method.

BACKGROUND OF THE INVENTION

In a responsive load service power consumption of devices connected to an electrical power grid is managed to respond to imbalance between power generated and power consumed across the power grid. A power grid which implements a responsive load service is sometimes referred as a 'smart' electrical grid. The responsive load service may be delivered by means of a centralised controller that monitors the power grid and responds to detected grid imbalances by communicating with groups of loads and/or individual loads to adjust their power consumption. Autonomous responsive loads may additionally or alternatively be used to deliver a responsive load service. Autonomous responsive loads independently monitor a measurable parameter of the power grid, such as frequency, fluctuations of which are indicative of a grid imbalance. The autonomous responsive loads automatically respond to detected fluctuations by adjusting their power consumption.

To smooth the power consumption adjustment response of a responsive load service and to avoid load synchronisation, a series or range of measurable grid imbalances (e.g. grid frequencies) can be used as triggers for an individual load and/or a group of loads to adjust their power consumption. In the case of autonomous responsive loads the degree of grid imbalance at which an individual load and/or group of loads is to be triggered is referred to herein as the load or loads "willingness to switch". The degree of grid imbalance at which a load or a group of loads are triggered to adjust their power consumption may be allocated randomly. However, a random allocation can result in some responsive loads tending to adjust their power consumption more often than other responsive loads within the responsive load population, which can be undesirable.

Certain types of power consuming devices such as, but not limited to, refrigerators, can be limited in their ability to deliver on demand power consumption changes as a result of their duty cycle. For such power consuming devices a measured variable (such as refrigerator internal temperature) can be used as a marker for the state of the device within its duty cycle. This measured variable is representative of the device's availability for delivering a responsive load service and in GB 2426878 is used in determining trigger grid frequencies across a population of power consuming devices, i.e. their 'willingness to switch'. Thus, a range of trigger frequencies can be allocated to 'less available' devices to ensure that these devices only adjust their power consumption during extreme grid frequency excursions. The resulting response of the total population of responsive loads is roughly linear with respect to frequency because for each device in the population of devices its duty cycle position should be random (if the duty cycles of power consuming devices within a population of devices become synchronised, the response becomes significantly non-linear).

Some power consuming devices operate in a very slow (timescale of a day) duty cycle or have no clearly defined duty cycle. Examples of such devices include heaters and ventilators. Such devices may be operated continuously in order to maintain air freshness but as part of a responsive load service can be turned off or turned up to a higher setting for a short period of time without adverse consequences. For these devices there is no obvious measured variable of the power grid that can be used to derive a "willingness to switch" trigger or a measured variable that would be randomly distributed across a population of such devices. It has been presumed that alterations to the normal power consumption behaviour of the devices should occur as rarely as possible and for as little time as possible, while meeting responsive load service requirements.

For a responsive load service utilising devices with no clearly defined duty cycle or long duration duty cycles, to date the approach has essentially involved randomly assigning to devices triggering frequencies in the applicable frequency range. This random assignment has been used in association with a plurality of behaviour rules, such as one or more of the following: minimum times for action; maximum times for action; etc.

A problem with the above approach, as revealed by modelling, is that the "load change" (be it increase or decrease) is not "fairly" shared across all devices. Devices with triggering frequencies far from the nominal frequency of the power grid are unlikely ever to be triggered. Whereas devices with trigger frequencies near to the nominal frequency of the power grid are likely to be triggered very frequently (perhaps every few minutes at times). Frequent triggering of a device can be prevented through the use of behaviour rules (e.g. no retriggering within 30 minutes) but the resultant performance of the responsive load service is generally unsatisfactory with poor tracking of frequency excursions.

Moreover, it has been found that resetting randomly assigned frequencies cannot fully solve this problem unless trigger resetting happens on a timescale of under an hour. However frequent (i.e. <60 mins) trigger resetting has other attendant problems and does not guarantee that the new trigger frequency assigned to a device is significantly different from the previous one, unless systematic rules to ensure this are used.

A centrally controlled responsive load service is described in U.S. Pat. No. 4,064,485 in which a plurality of different groups of responsive load are used to deliver a responsive load service. In U.S. Pat. No. 4,064,485 a first group of responsive loads are used in the delivery of a responsive load service in a predetermined order. In a second group of responsive loads, the loads are used to deliver the responsive load service in rotation. With the first group of loads, the same responsive load is always used first and inevitably will be used much more often than other responsive loads later in the group.

SUMMARY OF THE INVENTION

It is an aim of the present invention to provide an improved responsive load control method.

The present invention also seeks to provide a responsive load control method in which delivery of the responsive load service is more evenly distributed amongst a population of power consuming devices.

A further aim of the present invention is to provide an improved responsive load method suited for loads that are generally available to adjust their power consumption such as those loads that do not have a restrictive duty cycle.

Thus, the present invention provides a method of controlling a population of responsive loads coupled in operation to an electric power supply network having a nominal operating frequency, the population of responsive loads being adapted to deliver a responsive load service by varying their power consumption with respect to a function of the frequency of the electric power supply network, the method comprising a) assigning each responsive load of the population of responsive loads a trigger, the trigger corresponding to a frequency of the electric power supply network at which power consumption of the responsive load is to be adjusted; and thereafter b) for each responsive load available to deliver a responsive load service, adjusting the trigger of the responsive load to re-populate a frequency band previously depleted of responsive loads available for service as a result of the frequency of the electric power supply network deviating from its nominal operating frequency.

With the present invention the responsive load burden is shared more evenly across a plurality of responsive loads in a population of responsive loads. It is to be understood that in the context of this document reference to a population of responsive loads or power consuming devices is intended as reference to a plurality of responsive loads/power consuming devices and preferably the population involves thousands, tens of thousands, hundreds of thousands or more responsive loads or power consuming devices. Also, where there is a frequency excursion of the electric power supply network, with the present invention responsive loads that have already been activated to deliver a responsive load service can be replaced by available responsive loads from an adjacent frequency band so that further excursions of the power supply network to the same frequency range can be restricted.

Preferably in step b) the triggers of the responsive loads available to deliver a responsive load service are each adjusted by the same amount. The triggers may be each adjusted: i) by a predetermined amount; or ii) by an amount determined with respect to a difference between the frequency of the electric power supply network at two separate occasions since triggers were last assigned to the population of responsive loads. In a particularly preferred embodiment the triggers of the responsive loads available to deliver a responsive load service are each adjusted by an amount substantially equal to the difference between the most recent measurement representative of the frequency of the electric power supply network and the immediately preceding measurement.

Furthermore, in step b) the triggers of responsive loads available to deliver a responsive load service may be adjusted only when the most recent measurement of the electric power supply network is representative of a frequency closer to the nominal operating frequency than an immediately preceding measurement.

Preferably the method further comprises the step of, once a responsive load has been triggered to deliver a responsive load service and the most recent measurement of the electric power supply network is representative of a frequency closer to the nominal operating frequency than an immediately preceding measurement, adjusting the trigger either: i) by a predetermined amount; or ii) by an amount determined with respect to the difference between the most recent measurement of the electric power supply network and the immediately preceding measurement.

In a further aspect the present invention provides a method of controlling a responsive load coupled in operation to an electric power supply network having a nominal operating frequency, the responsive load being adapted to deliver a responsive load service by varying its power consumption with respect to a function of the frequency of the electric power supply network, the method comprises:

(a) assigning the responsive load a trigger, the trigger corresponding to a frequency of the electric power supply network at which power consumption of the responsive load is to be altered; and thereafter (b) where the responsive load remains available to deliver a responsive load service and the frequency of the electric power supply network is between its nominal operating frequency and the frequency corresponding to the trigger of the responsive load, adjusting the trigger of the responsive load so that the adjusted trigger corresponds to a frequency closer to the nominal operating frequency.

Preferably in step (b) the trigger of the responsive load is adjusted: i) by a predetermined amount; or ii) by an amount determined with respect to a difference between the frequency of the electric power supply network at two separate occasions since the trigger was last assigned. In a particularly preferred embodiment the trigger of the responsive load is adjusted by an amount substantially equal to the difference between the most recent measurement representative of the frequency of the electric power supply network and the immediately preceding measurement.

Also, in step (b) the trigger of the responsive load may be adjusted only when the most recent measurement of the electric power supply network is representative of a frequency closer to the nominal operating frequency than an immediately preceding measurement.

In a particularly preferred embodiment the present invention provides a method of controlling a responsive load coupled in operation to an electric power supply network having a nominal grid frequency ($f_0$), the responsive load being adapted to deliver a responsive load service by varying its power consumption with respect to a function of the frequency ($f_n$) of the electric power supply network, the method comprising:

(a) arranging for the responsive load to be triggered to provide responsive load service when the grid frequency ($f_n$) varies in respect of a trigger frequency (g) of the load;

(b) while the responsive load is not triggered to provide responsive load service, the grid frequency ($f_n$) being between the trigger frequency (g) of the load and the nominal grid frequency ($f_0$):

(i) providing no responsive load service when the grid frequency ($f_n$) is the opposite side of the nominal grid frequency to the trigger frequency (g);

(ii) providing no responsive load service when the most recent grid frequency ($f_n$) is closer to the trigger frequency (g) than the grid frequency at a previous temporal step ($f_{n-1}$), namely either $g<f_0$, $Df<0$ and $Df=(f_n)-(f_{n-1})$, or $g>f_0$, $Df>0$ and $Df=(f_n)-(f_{n-1})$ (iii) adjusting the trigger frequency (g) by an amount Df when the grid frequency ($f_n$) is closer to the nominal frequency $f_0$ than the grid frequency at a previous temporal step $(f_{n-1})$, namely
either $g<f_0$, $Df>0$ and $Df=(f_n)-(f_{n-1})$,
or $g>f_0$, $Df<0$ and $Df=(f_n)-(f_{n-1})$ (c) when the responsive load is triggered by the trigger frequency (g) being closer to the nominal frequency $f_0$ than the grid frequency $(f_n)$ and the grid frequency at a previous temporal step $(f_{n-1})$ is closer to the nominal grid frequency $f_0$, than the grid frequency $(f_n)$, maintaining the trigger frequency (g) substantially constant; and (d) when the responsive load is triggered by the trigger frequency (g) being closer to the nominal frequency $f_0$ than the grid frequency $(f_n)$ and the grid frequency $(f_n)$ is closer to the nominal grid frequency $f_0$ than the grid frequency at a previous temporal step $(f_{n-1})$, adjusting the trigger frequency (g) by an amount Df;

(e) when triggering of the responsive load ends, namely after a first temporal step when the grid frequency $(f_n)$ is closer to the nominal grid frequency $f_0$ than the trigger frequency (g), assigning a new trigger frequency (g).

In step (e) the new trigger may be assigned randomly or quasi-randomly within a frequency range. Alternatively, the trigger may be assigned according to the following function:

$$g_m = (f_0 - k_f) + f_n - g_{m-1}$$

where $k_f$ is a frequency offset.

In a further aspect the present invention provides a responsive load adapted to deliver a responsive load service by varying its power consumption with respect to a function of the frequency of an electric power supply network, the responsive load having a power coupling for coupling the responsive load to the electric power supply network and the responsive load having a load management operable to perform the method described above.

In a still further aspect the present invention provides a software product stored on a machine-readable storage medium, the software product being executable by a processor for executing the method described above.

BRIEF DESCRIPTION OF THE DRAWINGS

Embodiments of the present invention will now be described by way of example only, with reference to the accompanying drawings in which.

DETAILED DESCRIPTION OF PREFERRED EMBODIMENTS

Before describing in detail exemplary embodiments, it should be noted that the embodiments reside primarily in combinations of method steps and apparatus components for providing a responsive load service. Accordingly, the method steps and apparatus components have been represented, where appropriate, by conventional symbols in the drawings, showing only those specific details that are pertinent to understanding the exemplary embodiments and for the sake of clarity omitting features that will be readily apparent to those of ordinary skill in the art having the benefit of the description herein. In this regard it is envisaged that components and method steps described in one of the exemplary embodiments may, in certain circumstances, be utilized or implemented in other of the exemplary embodiments.

It will be appreciated that the exemplary embodiments described herein may be comprised of one or more conventional processors and unique stored program instructions that control the one or more processors to implement, in conjunction with certain non-processor circuits, some, most, or all of the functions for providing a responsive load service. The non-processor circuits may include, but are not limited to: a communications transceiver such as a radio receiver and a radio transmitter; signal drivers; clock circuits; power source circuits; and user input devices. Alternatively, some or all of the responsive load service functions could be implemented by a state machine that has no stored program instructions, or in one or more application specific integrated circuits (ASICs), in which each function or some combinations of certain of the functions are implemented as custom logic. Of course, a combination of these approaches could also be used. Thus, methods and means for these functions have been described herein. Further, it is expected that one of ordinary skill, when guided by the concepts and principles described herein, will be readily capable of generating such software instructions and programs and ICs with minimal experimentation.

Figure 1:
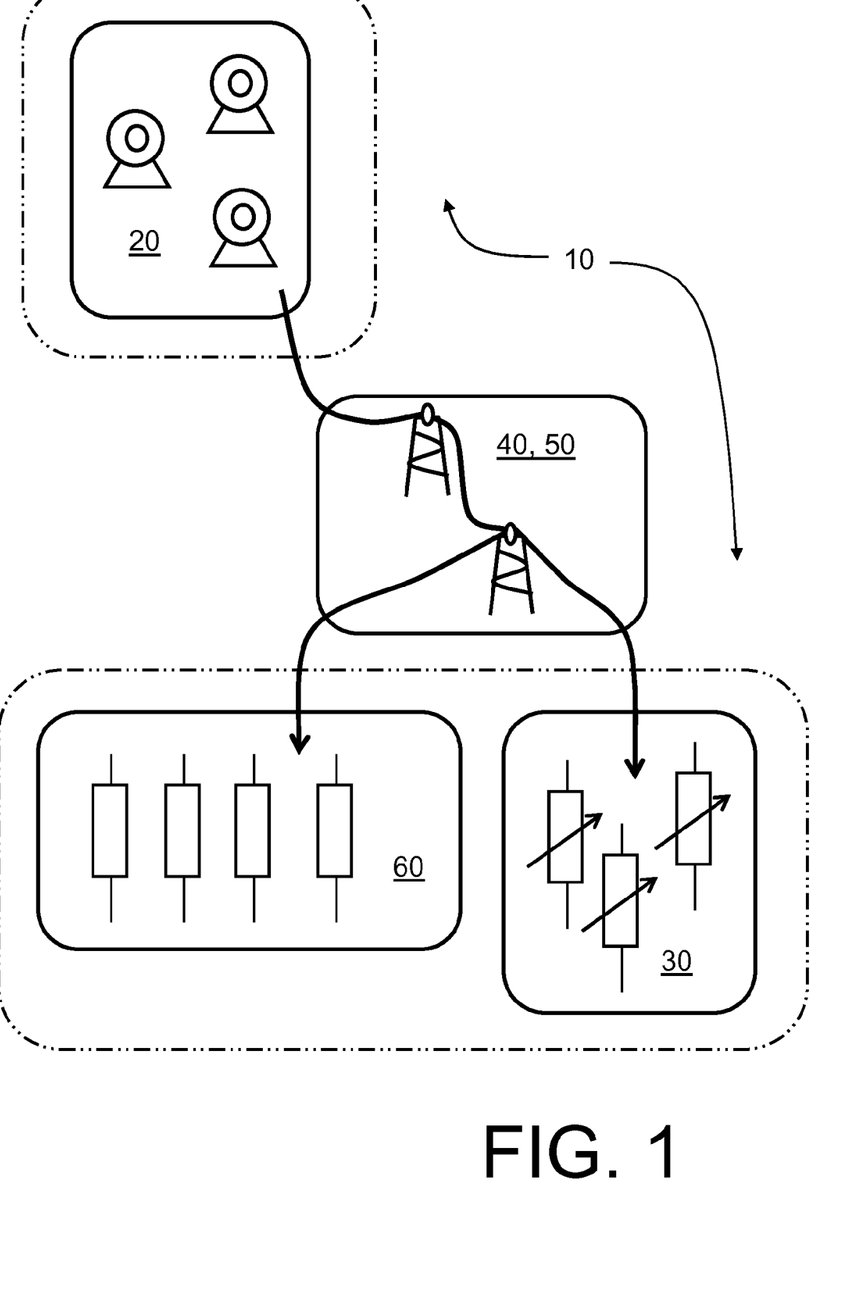
FIG. 1 illustrates a system for delivering a responsive load service in accordance with the present invention.

In FIG. 1 a power supply grid 10 comprises one or more power generators 20 coupled, via a first power distribution network 40, to one or more power consuming devices adapted to operate as responsive loads 30 in a responsive load service. The power grid 10 is also coupled, either via the same first power distribution network 40 or via a separate second power distribution network 50, to one or more spatially distributed power consuming devices 60.

The one or more responsive loads 30 may be autonomous responsive loads such as those described in, but not limited to, WO 2006/128709. As mentioned earlier, an autonomous responsive load 30 is adapted to vary its power consumption in response to detected variations in a physical parameter of the grid (e.g. operating frequency) monitored locally by the responsive load. The autonomous responsive load 30 determines whether load balancing is required by monitoring a physical parameter of the power distribution network 40.

Alternatively, the one or more responsive loads 30 may be remotely-controlled. For remotely-controlled responsive loads 30, their power consumption is varied in response to received commands in the form of power control signals transmitted from a spatially remote location such as a control centre or coordinating centre (not illustrated). The coordinating centre may be under the control of and operated by a power distribution network operator or may be under the control and operated by a third party delivering responsive load service to the power distribution operator. In a still further alternative, the responsive loads 30 may be adapted to combine both autonomous operation and remote-control operation.

Figure 2:
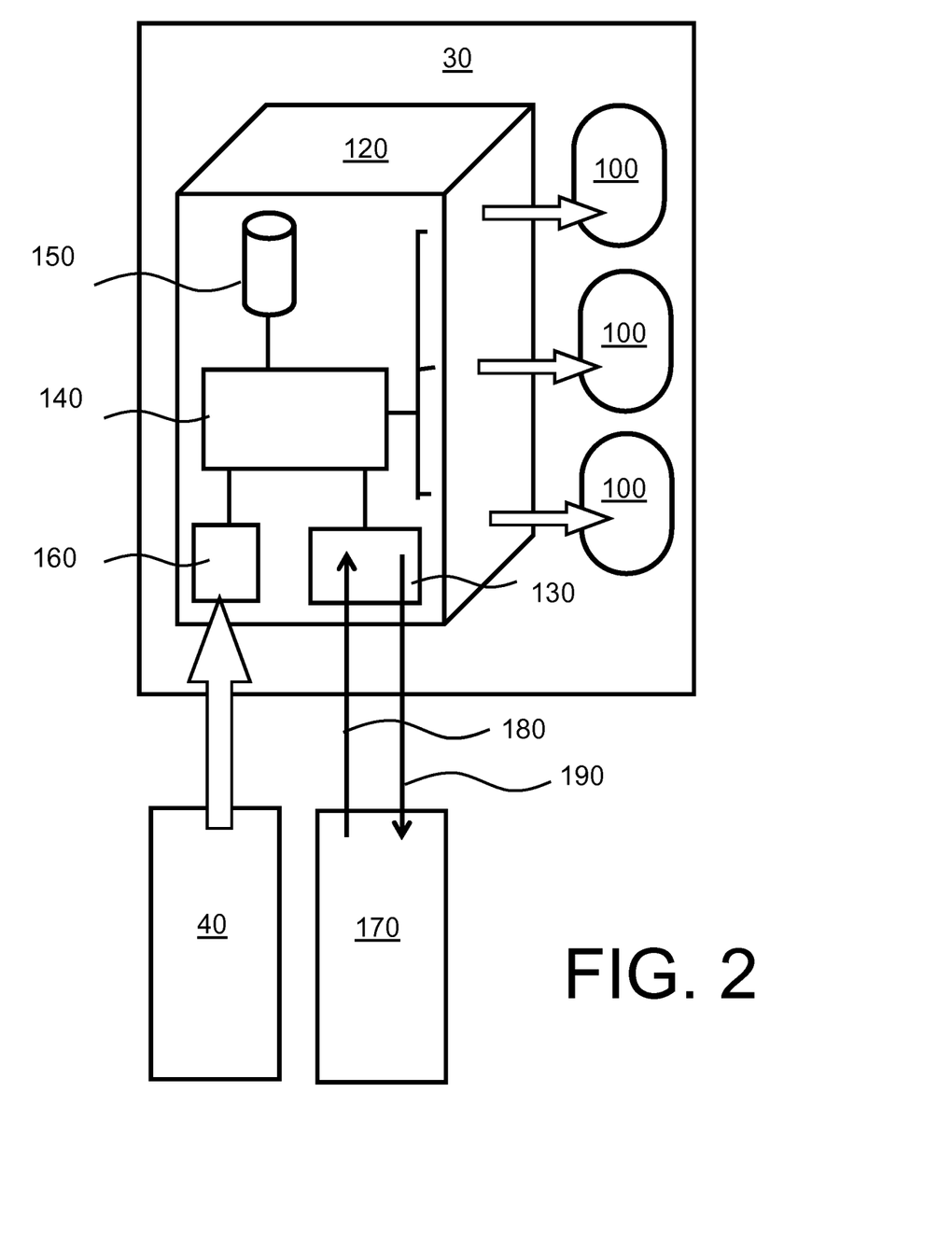
FIG. 2 illustrates a responsive load implementing a responsive load control method in accordance with the present invention.

A responsive load 30 is shown in FIG. 2. Each responsive load includes a load controller 120 coupled to the power coupling network 40 and in communication with at least one power consuming element 100. The load controller 120 is operable to cause its associated one or more power consuming elements 100 to consume power to a magnitude determined by a monitored physical parameter of the power coupling network 40 and/or in response to remotely transmitted commands received by the load controller 120. In FIG. 2, the load controller 120 further includes a communications interface 130 for receiving signals 180 from a remote control centre or controller 170 of the responsive load service. The signals 180 may be communicated by the controller or coordinating centre 170 using one or more different communication media, networks and protocols, for example wireless transmission, wired transmission, optical fibre transmission, telephony, satellite, the Internet and so forth. In FIG. 2 two-way communication 180, 190 between the load controller 120 and the remote controller 170 is shown but one-way communication from the controller 170 to the responsive load 30 is also envisaged.

As shown in FIG. 2 the load controller 120 includes a processor 140 for performing the program steps necessary to implement a responsive load service. The processor 140 is in communication with a memory 150 constituting data and program storage; the communications interface 130; and each of the associated power consuming elements 100. The memory 150 has physical form and as such is non-transitory such as, but not limited to, a disk drive. The load controller 120 in FIG. 2 is an autonomous responsive load and so the processor 140 is additionally in communication with a frequency monitor 160 which monitors fluctuations in the frequency of the power distribution network 40. In the case of a remotely controlled load controller 120, the frequency monitor 160 would be omitted.

The frequency monitor 160 illustrated in FIG. 2 may be omitted or over-ridden where frequency information or control signals based on grid frequency data are transmitted to the responsive load from a remote controller 170. Similarly some, possibly all, of the functionality of the processor 140 may be implemented remotely. In one alternative it is envisaged that remote management and control of a population of responsive loads may be implemented using cloud computing technology with program functions and data remotely stored in a distributed manner.

Operation of the responsive load 30 for the delivery of a responsive load service is similar to that described in GB 2426878, the contents of which is incorporated herein by reference. Differences to responsive load operation as described in GB 2426878, in accordance with the present invention, are described in detail below.

Two related algorithms are described below which when implemented as part of a responsive load control program, as stored in the memory 150 of the load controller 120, assist in at least mitigating and preferably avoiding the problems encountered with known responsive load services described above. In their simplest application, these algorithms have the following common characteristics:

They follow the requirement for responsive load service as closely as possible (given a finite number of randomly spaced triggering frequencies);

They ensure the load changes are fairly and evenly shared by all power consuming devices (substantially equally shared on average, although not for a given excursion);

They ensure that after a responsive load is triggered, every other load is then triggered before the originally triggered responsive load is triggered again. (For one algorithm the sequence holds with respect to the start of triggering, for the other algorithm the sequence holds with respect to the end of triggering).

Simple adjustments to the algorithm to trade accuracy, or re-use rate, against load capacity are possible.

Algorithm A

The algorithm is described from the point of view of an individual responsive load's triggering frequency. This description presumes a load 120 is to be turned off, as required, to reduce demand during low frequency excursions; the extension to turning devices on at high frequency excursions is obvious.

For a given responsive load, at some start time, a 'low' trigger frequency is randomly assigned in the relevant frequency range (in the case of the United Kingdom the frequency range may be 49.5-50 Hz). At each subsequent timestep or relevant clock cycle (e.g. every second) the device measures the grid frequency $f(t_n)$ and applies the following rules:

---

WHILE NOT TRIGGERED (trigger frequency < measured grid frequency)

IF the measured grid frequency is above nominal frequency (e.g. 50 Hz), take no action.

IF the measured grid frequency is less than the measured grid frequency at the previous timestep (Df<0, with Df = $f_n - f_{n-1}$), take no action.

IF the measured grid frequency is greater than the grid frequency at the previous timestep (Df>0), increase the trigger frequency by an amount Df.

WHILE TRIGGERED (trigger frequency > measured grid frequency)

hold trigger frequency constant (i.e. use same frequency to end triggered state).

WHEN TRIGGERING ENDS (i.e. on first timestep when (trigger frequency < grid frequency))

set the new trigger frequency to (49.5 + grid_freq – trig_freq) (for the UK).

---

Figure 3:
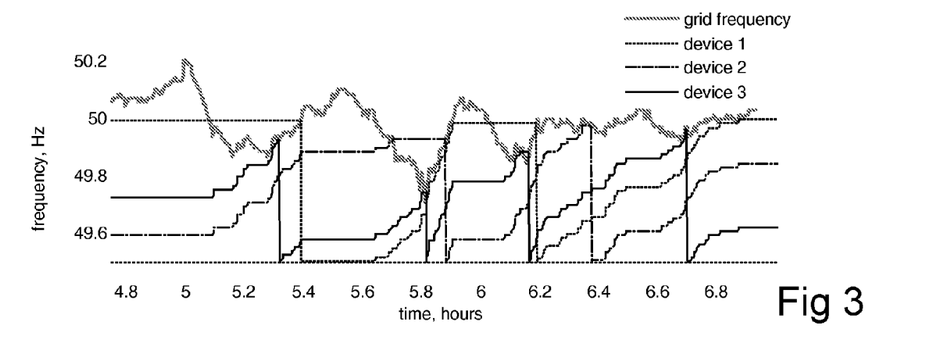
FIG. 3 is a graph of the modelled response of three devices to variations in grid frequency, each of the devices having a different trigger frequency and each device implementing a first responsive load control method in accordance with the present invention.
Figure 4:
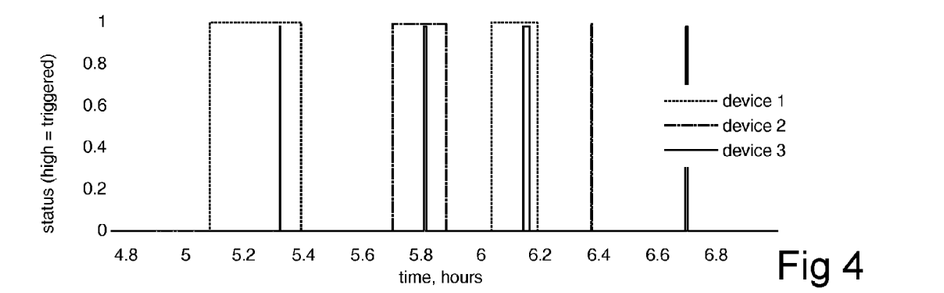
FIG. 4 is a graph of the timing when the three devices of FIG. 2 were each triggered.
Figure 5:
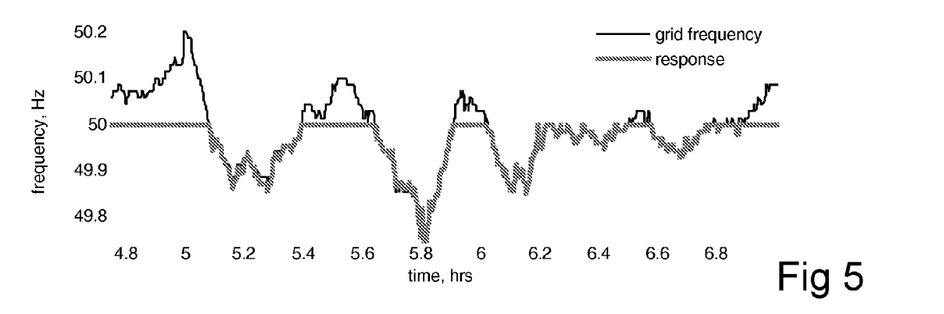
FIG. 5 is a graph of the grid frequency tracking of a population of 1500 devices implementing the first responsive load control method in accordance with the present invention.

Implementation of Algorithm A with respect to three responsive loads is illustrated in FIGS. 3-5. FIG. 3 shows how the trigger frequencies of three devices (each of which starts with a different trigger frequency) respond to variations in grid frequency. It is seen that, when not triggered, the loads' trigger frequencies 'march upwards' in sync, responding to the grid frequency as described above. Once triggered, the responsive loads stay triggered until the original triggering condition ends.

It is further envisaged that a "maximum triggered time" may be added to Algorithm A which would only apply for a fixed initial period of any given grid frequency excursion.

In the allocation and management of 'low' frequency triggers, as described above, triggering only occurs when the grid frequency is decreasing. In this grid state the triggering frequencies "hold steady", waiting to be reached.

FIG. 4 shows the timing of when each of the devices is triggered. It can be seen that the devices are triggered in the same order that they were earlier released, thereby maximising the time between triggering.

FIG. 5 shows how well (with 1500 responsive loads) the demand response tracks negative excursions in grid frequency.

A problem with Algorithm A is that a responsive load can be triggered for the whole duration of an excursion. Algorithm B, set out below, addresses this problem.

Algorithm B

The algorithm is described from the point of view of an individual responsive load's triggering frequency. This description presumes a load 120 is to be turned off, as required, to reduce demand during low frequency excursions; the extension to turning devices on at high frequency excursions is obvious.

For a given responsive load, at some start time, a 'low' trigger frequency is randomly assigned in the relevant frequency range (in the case of the United Kingdom the frequency range may be 49.5-50 Hz). At each subsequent timestep or relevant clock cycle (e.g. every second) the device measures the grid frequency $f(t_n)$ and applies the following rules:

---

WHILE NOT TRIGGERED (trigger frequency < measured grid frequency)
    IF the measured grid frequency is above 50 Hz, take no action.
    IF the measured grid frequency is less than the measured grid frequency at the previous timestep (Df<0, with Df = $f_n - f_{n-1}$), take no action.
    IF the measured grid frequency is greater than the measured grid frequency at the previous timestep (Df>0), increase the trigger frequency by an amount Df.
    WHILE TRIGGERED (trigger frequency > grid frequency)
    IF the measured grid frequency is less than the measured grid frequency at the previous timestep (Df<0, with Df = $f_n - f_{n-1}$), take no action.
    IF the measured grid frequency is greater than the measured grid frequency at the previous timestep (Df>0), increase the trigger frequency by an amount Df.
    IF the trigger frequency becomes greater than the grid nominal frequency (e.g. 50 Hz), set the trigger frequency to (trig_freq – FF). Where FF is a predetermined constant. In the UK, FF would normally be 0.5 Hz. This will generally end the triggering condition (unless the grid frequency is below the lower threshold of the trigger frequency range (e.g. 49.5 Hz for the UK).

---

Figure 6:
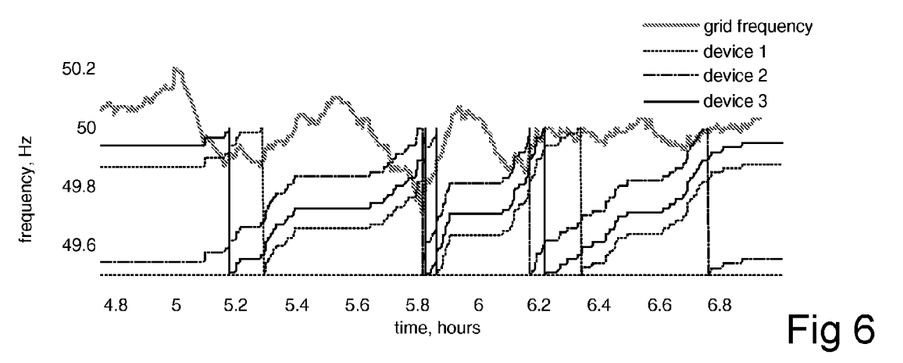
FIG. 6 is a graph of the modelled response of three devices to variations in grid frequency, each of the devices having a different trigger frequency and each device implementing a second responsive load control method in accordance with the present invention.
Figure 7:
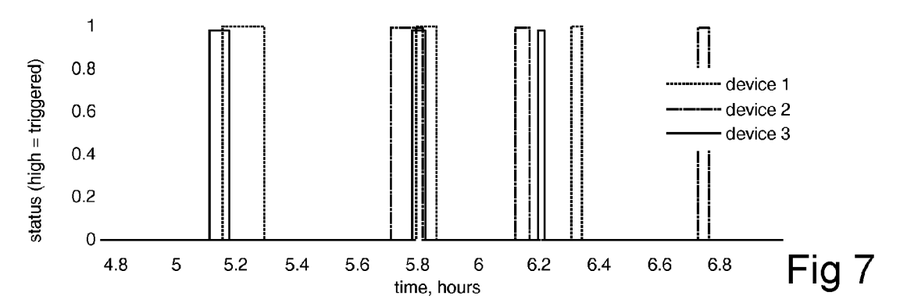
FIG. 7 is a graph of the timing when the three devices of FIG. 1 were each triggered.
Figure 8:
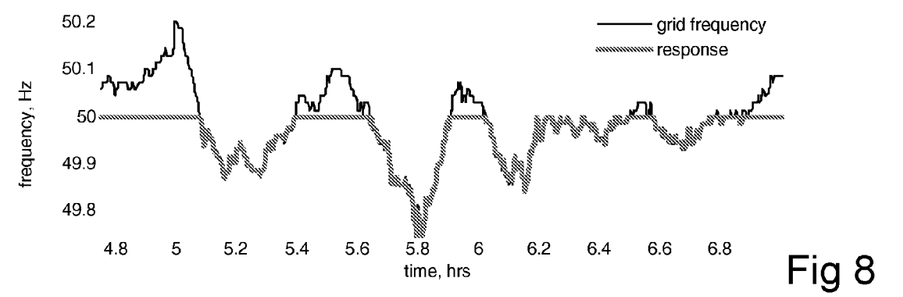
FIG. 8 is a graph of the grid frequency tracking of a population of 1500 devices implementing the first responsive load control method in accordance with the present invention.

Implementation of Algorithm B with respect to three responsive loads is illustrated in FIGS. 6-8. FIG. 6 shows how the trigger frequencies of three devices (each of which starts with a different trigger frequency) respond to variations in grid frequency. It is seen that, when not triggered, the responsive loads' trigger frequencies "march upwards" in sync, responding to the grid frequency, as described above. Once triggered, they stay triggered until the original triggering condition ends.

It is further envisaged that a "maximum triggered time" may be added to Algorithm B which would only apply for a fixed initial period of any given grid frequency excursion.

FIG. 7 shows when the responsive loads are triggered. In contrast with Algorithm A, it is seen that the triggering remains in the same order and that triggering off follows the same cycle as triggering on. No responsive load is generally triggered for the whole period of an excursion; triggering periods are more even across responsive loads.

FIG. 7 shows how well (with 1500 devices) the demand response tracks negative excursions in grid frequency.

It will be noted that in the implementations described above, the frequency and duration of triggering periods is purely a function of grid frequency (i.e. independent of the number of devices). It may be that this results in individual responsive loads being triggered more frequently than acceptable, or for longer than acceptable (although by design these are the minimum possible triggering periods to delivers maximum response). In this case, two steps can be taken:

a) a "maximum triggered period" may be applied to each responsive load.

b) the frequency of triggering can be reduced by, for example, disabling "1 trigger in 2", "2 in 3", and so on; reducing the frequency of triggering at the cost of reducing response by a factor of 2, 3, etc. (With caution one could even disable "1 trigger in 3", which would reduce response by ⅔, etc.)

It should be noted that it is possible to implement the above responsive load control methods to interact with an "available/not available" signal for a particular responsive load (e.g. a device turned on or off by a clock, duty cycle, or user demand). The simplest approach is to keep the algorithm running all the time, and to ignore triggers occurring when the responsive load is not available. This maintains the integrity of the algorithm but at the cost of reducing the theoretically available response.

An alternative approach is to freeze the algorithm (i.e. hold the trigger frequency constant) while the responsive load is not available to be triggered. The trigger frequency could then be reset to a predetermined threshold, or to a random level, when the device becomes available again. A disadvantage with this alternative approach is that, if several responsive loads have the same timing (e.g. driven by store opening hours), the random spread of trigger frequencies can be affected, thus causing the responsive load service to become non-linear.

Responsive loads which are normally off can be turned on to increase power consumption, during positive frequency excursions and the same algorithms can be employed to control operation of the responsive loads, with obvious changes to accommodate the fact that this would be a response to a positive frequency excursion.

Responsive loads able to respond to frequency excursions in both frequency directions (e.g. fans that normally run at part load but are able to speed up to 100% or slow to 0% power) require a bit more care. The simplest solution is to compute independently two triggers: "high" and "low" (one trigger frequency above the nominal grid frequency and the other below the nominal grid frequency). The two triggers would be decoupled and would not be triggered simultaneously.

A disadvantage of the approach set out above is that it would be possible for positive and negative triggers to occur in rapid succession. If this is an issue, rules can be added to prevent this but, inevitably, at the cost of reducing available response.

It is possible that numerical rounding and limitations in the accuracy of frequency measurement could lead to triggering frequencies "clustering" and thus losing full randomness. To mitigate this it is desirable to reset the trigger frequencies, randomly, on a time basis (e.g. every 8 hours).

Figure 9:
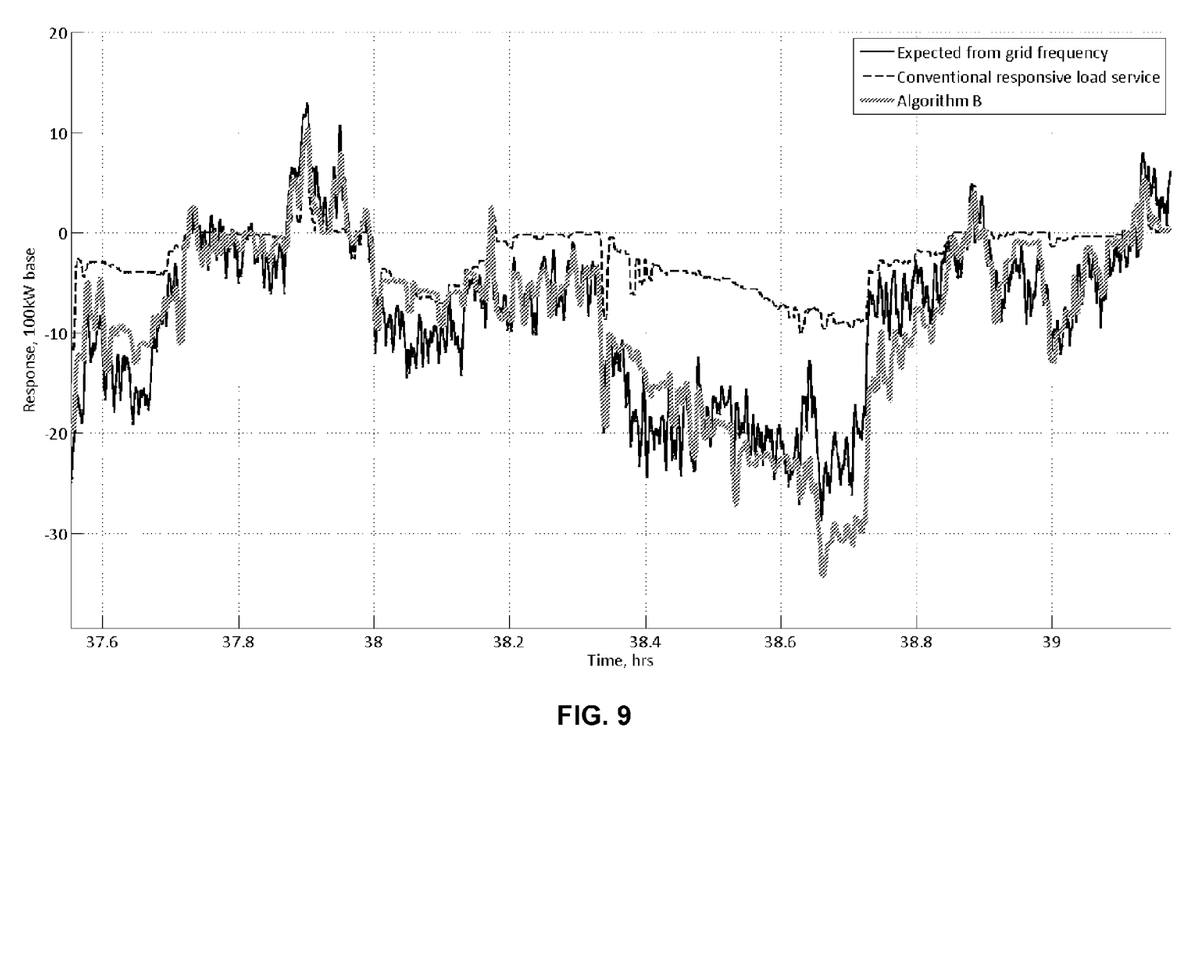
FIG. 9 is a first simulation comparing the frequency tracking of a known responsive load service to the frequency tracking of a responsive load service in accordance with the present invention.
Figure 10:
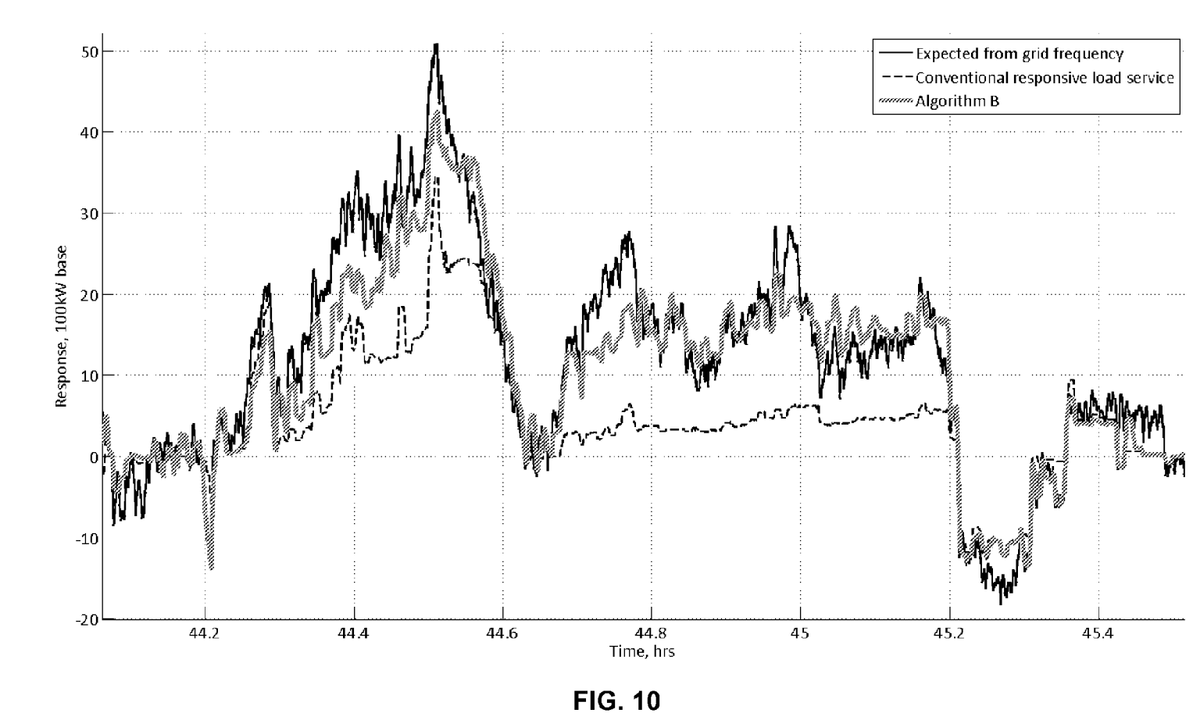
FIG. 10 is a second simulation comparing the frequency tracking of a known responsive load service to the frequency tracking of a responsive load service in accordance with the present invention.

In FIG. 9 a first simulation is shown comparing the frequency tracking of a conventional responsive load service to the frequency tracking of a responsive load service implementing Algorithm B in which an underlying trend is masked by small scale variations. In FIG. 10 a second simulation is shown comparing the frequency tracking of the conventional responsive load service to the frequency tracking of a responsive load service implementing Algorithm B in which the measured grid frequency repeatedly deviates from the nominal grid frequency. In Table 1 performance characteristics of the conventional responsive load service and the responsive load service implementing Algorithm B based upon the simulations of FIGS. 9 and 10 are set out.

TABLE 1

| Algorithm | Average total availability (MW) | RMS tracking error (%) | 90$^{th}$ percentile tracking error |
|---|---|---|---|
| Conventional | 9.6 | 6.8% | 11.5% |
| B | 9.3 | 2.9% | 4.8% |

Although only two exemplary embodiments of the present invention have been described in detail above, those skilled in the art will readily appreciate that many modifications are possible in the exemplary embodiments without departing from the novel teachings and advantages of the present invention. Accordingly, all such modifications are intended to be included within the scope of the present invention as defined in the following claims.

The trigger frequencies of the responsive loads may be allocated randomly or quasi-randomly within a range of frequencies representative of typical frequency excursions from the nominal grid frequency. Alternatively allocation of the trigger frequencies may be according to a predetermined function. Furthermore, in the case of responsive loads managed remotely, triggers assigned to the responsive loads may be data objects having no physical units and the remotely issued control signals that adjust the data objects are determined on the basis of remotely monitored grid frequencies.

In the exemplary embodiments the trigger frequencies of the responsive loads are adjusted with respect to a difference between the most recent frequency measurement and the immediately preceding measurement. It will be apparent that frequency measurements earlier than the immediately preceding measurement may alternatively be used in calculating the frequency difference. Also, the adjustment may instead be based on a function of the frequency difference or a function of the most recent frequency measurement. In a further alternative the adjustment of the trigger frequencies may be by a predetermined amount.

Expressions such as "including", comprising", incorporating", consisting of", "have", "is" used to describe and claim the present invention are intended to be construed in a non-exclusive manner, allowing for items, components or elements not explicitly described also to be present. Furthermore, reference to the singular is to be construed to relate also to the plural.

The invention claimed is:

1. A method using a controller to control a responsive load coupled in operation to an electric power supply network having a nominal grid frequency ($f_0$), the responsive load being adapted to deliver a responsive load service by varying its power consumption with respect to a function of grid frequency ($f_n$) of the electric power supply network, the method comprising:
   (a) arranging for the responsive load to be triggered to provide responsive load service when the grid frequency ($f_n$) varies in respect of a trigger frequency (g) of the responsive load;
   (b) while the responsive load is not triggered to provide responsive load service, the grid frequency ($f_n$) being between the trigger frequency (g) of the load and the nominal grid frequency ($f_0$):
      (i) providing no responsive load service when the grid frequency ($f_n$) is on an opposite side of the nominal grid frequency ($f_0$) to the trigger frequency (g);
      (ii) providing no responsive load service when a most recent grid frequency ($f_n$) is closer to the trigger frequency (g) than a grid frequency $f_{n-1}$) at a previous temporal step, namely
      either $g<f_0$, $Df<0$ and $Df=(f_n)-(f_{n-1})$,
      or $g>f_0$, $Df>0$ and $Df=(f_n)-(f_{n-1})$
      (iii) adjusting the trigger frequency (g) by an amount Df when the grid frequency ($f_n$) is closer to the nominal frequency $f_0$ than the grid frequency at a previous temporal step ($f_{n-1}$), namely
      either $g<f_0$, $Df>0$ and $Df=(f_n)-(f_{n-1})$,
      or $g>f_0$, $Df<0$ and $Df=(f_n)-(f_{n-1})$
   (c) when the responsive load is triggered by the trigger frequency (g) being closer to the nominal frequency $f_0$ than the grid frequency ($f_n$) and the grid frequency at a previous temporal step ($f_{n-1}$) is closer to the nominal grid frequency $f_0$, than the grid frequency ($f_n$), maintaining the trigger frequency (g) substantially constant; and
   (d) when the responsive load is triggered by the trigger frequency (g) being closer to the nominal frequency $f_0$ than the grid frequency ($f_n$) and the grid frequency ($f_n$) is closer to the nominal grid frequency ($f_0$) than the grid frequency ($f_{n-1}$) at a previous temporal step, adjusting the trigger frequency (g) by an amount Df;
   (e) when triggering of the responsive load ends, namely after a first temporal step when the grid frequency ($f_n$) is closer to the nominal grid frequency ($f_0$) than the trigger frequency (g), assigning a new trigger frequency (g).

2. A method as claimed in claim 1, wherein in step (e) the new trigger frequency (g) is assigned randomly within a frequency range.

3. A method as claimed in claim 1, wherein in step (e) the new trigger frequency (g) is assigned according to the following function:

$$g_m=(f_0-k_f)+f_n-g_{m-1}$$

where $k_f$ is a frequency offset.

4. A responsive load adapted to deliver a responsive load service by varying its power consumption with respect to a function of a grid frequency of an electric power supply network, the responsive load having a power coupling for coupling the responsive load to the electric power supply network and the responsive load having a load management operable to perform the method of claim 1.

5. A non-transitory computer readable medium storing instructions wherein the instructions are executed by a processor of a load controller for executing a method of controlling a responsive load coupled in operation to an electric power supply network having a nominal grid frequency ($f_0$), the responsive load being adapted to deliver a responsive load service by varying its power consumption with respect to a function of grid frequency ($f_n$) of the electric power supply network, the method comprising:
   (a) arranging for the responsive load to be triggered to provide responsive load service when the grid frequency ($f_n$) varies in respect of a trigger frequency (g) of the responsive load;

(b) while the responsive load is not triggered to provide responsive load service, the grid frequency ($f_n$) being between the trigger frequency (g) of the load and the nominal grid frequency ($f_0$):
  (i) providing no responsive load service when the grid frequency ($f_n$) is on an opposite side of the nominal grid frequency ($f_0$) to the trigger frequency (g);
  (ii) providing no responsive load service when a most recent grid frequency ($f_n$) is closer to the trigger frequency (g) than a grid frequency ($f_{n-1}$) at a previous temporal step, namely
  either $g<f_0$, $Df<0$ and $Df=(f_n)-(f_{n-1})$,
  or $g>f_0$, $Df>0$ and $Df=(f_n)-(f_{n-1})$
  (iii) adjusting the trigger frequency (g) by an amount Df when the grid frequency ($f_n$) is closer to the nominal frequency $f_0$ than the grid frequency at a previous temporal step ($f_{n-1}$), namely
  either $g<f_0$, $Df>0$ and $Df=(f_n)-(f_{n-1})$,
  or $g>f_0$, $Df<0$ and $Df=(f_n)-(f_{n-1})$ (c) when the responsive load is triggered by the trigger frequency (g) being closer to the nominal frequency $f_0$ than the grid frequency ($f_n$) and the grid frequency at a previous temporal step ($f_{n-1}$) is closer to the nominal grid frequency $f_0$, than the grid frequency ($f_n$), maintaining the trigger frequency (g) substantially constant; and (d) when the responsive load is triggered by the trigger frequency (g) being closer to the nominal frequency $f_0$ than the grid frequency ($f_n$) and the grid frequency ($f_n$) is closer to the nominal grid frequency ($f_0$) than the grid frequency ($f_{n-1}$) at a previous temporal step, adjusting the trigger frequency (g) by an amount Df;

(e) when triggering of the responsive load ends, namely after a first temporal step when the grid frequency ($f_n$) is closer to the nominal grid frequency ($f_0$) than the trigger frequency (g), assigning a new trigger frequency (g).

* * * * *